UNITED STATES PATENT OFFICE.

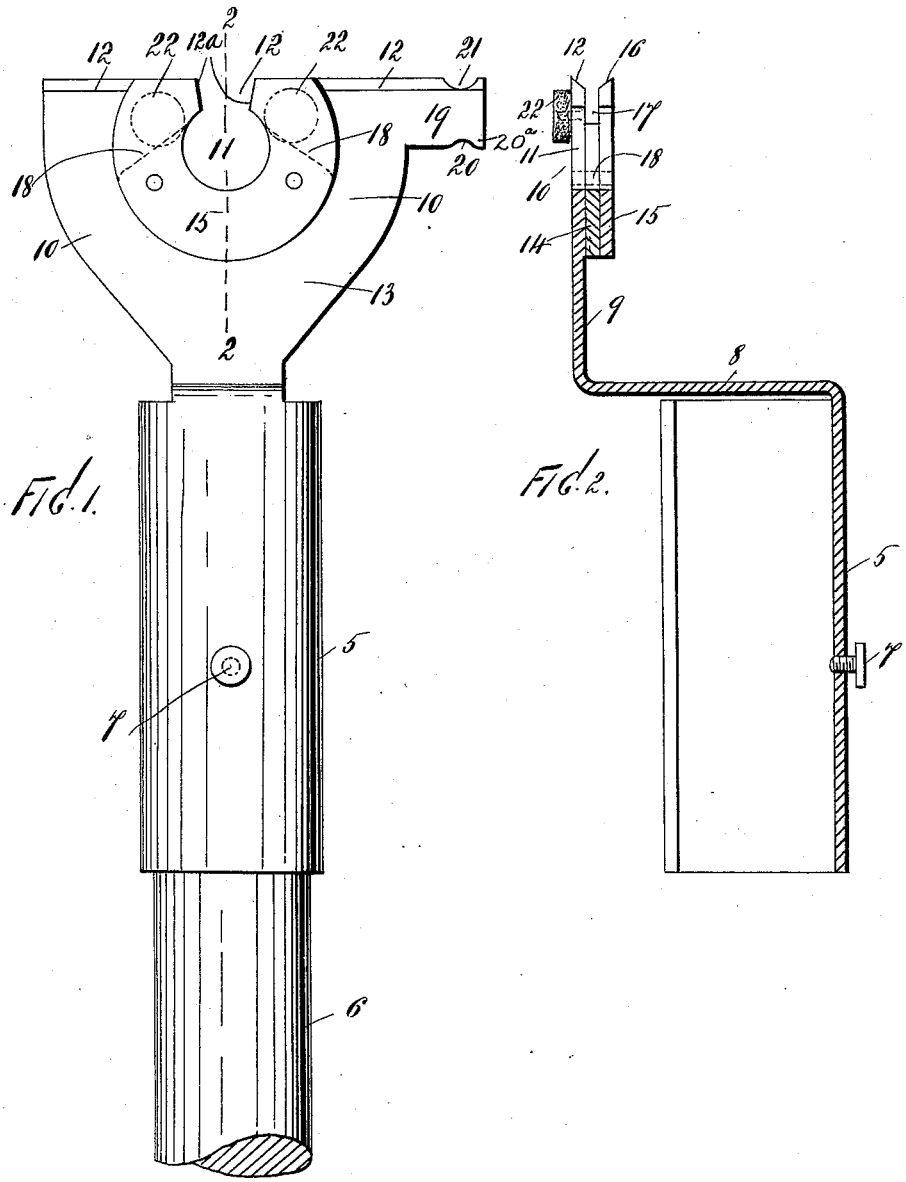

ALFRED FOSGATE, OF AUBURN, NEW YORK.

PICTURE-HANGER.

SPECIFICATION forming part of Letters Patent No. 606,710, dated July 5, 1898.

Application filed December 1, 1897. Serial No. 660,367. (No model.)

*To all whom it may concern:*

Be it known that I, ALFRED FOSGATE, a citizen of the United States, residing at Auburn, in the county of Cayuga and State of New York, have invented certain new and useful Improvements in Picture-Hangers, of which the following is a full and complete specification, such as will enable those skilled in the art to which it appertains to make and use the same.

This invention relates to picture-hangers; and the object thereof is to provide an improved device of this class which is simple in construction and operation and by means of which a picture-frame or other article may be quickly and easily suspended from a nail, hook, or other support, and whereby a picture-hook may also be removed from its support, together with the picture-frame or other article, when desired, a further object being to provide a device of this class which may be used for lowering a window and also for manipulating a gas cock or valve so as to turn on or off the gas.

The invention is fully disclosed in the following specification, of which the accompanying drawings form a part, in which—

Figure 1 is a side view of my improved picture-hanger, and Fig. 2 a partial section on the line 2 2 of Fig. 1.

In the drawings forming part of this specification the separate parts of my improvement are designated by the same numerals of reference in each of the views, and in the practice of my invention I provide an oblong sleeve or casing 5, which is adapted to receive a handle 6, and said sleeve or casing is preferably tubular in form and is composed of a piece of sheet metal folded and provided with a set-screw 7, by which it may be secured to and adjusted on the handle 6.

Connected with the upper end of the sleeve or casing 5 at one side thereof and preferably formed integrally therewith is a strip 8, which is bent transversely of the top of the sleeve or casing, so as to prevent the handle from projecting too far therethrough, and said strip is provided with an upwardly-directed arm or extension 9, on which are formed two upwardly-directed flat and curved arms 10, between the upper ends of which is a circular opening 11, which opens upwardly by means of a passage or opening 12, by which the separate arms 10 are separated, and the upper ends of the arms 10 are projected horizontally and beveled on their front sides, as shown at 12.

Secured to the head 13 of the arm 9 and below the circular opening 11 is a curved plate 14, and secured to the curved plate 14 is a plate 15, which is cut away at the top and provided with a passage or opening which corresponds with the passage or opening 12, and the upper portions of the opposite sides of the plate 15 are beveled on their inner sides, as shown at 16, and the side walls of the passage or opening 12 between the arms 10 and the upper parts of the annular plate 15 are beveled inwardly and downwardly, as shown at 12$^a$, so as to facilitate the operation of the device or the suspension of a picture or other frame from a nail, hook, or other support and the removal of a hook from its support when desired. As thus constructed, it will be seen that there is a space 17 between the upper ends of the opposite sides of the plate 15 and the arms 10, and the ends of the plate 14 are beveled, as shown at 18 in dotted lines in Fig. 1 and in full lines in Fig. 2, the object of this construction being to facilitate the operation of the device and prevent the cutting of the picture-cord in the hanging of a picture or other frame.

Formed on one of the arms 10 and projecting laterally therefrom is a supplemental arm 19, which is provided at the end thereof and on the under side thereof with a notch or recess 20, whereby a downwardly-directed projection 20$^a$ is formed, and a corresponding notch or recess 21 is formed in the upper side thereof adjacent to the end, and said supplemental arm 19 may be used for raising and lowering a window and also for hanging picture-frames provided with loops, said arm being passed into said loop and the loop resting in the notch or recess 21, so as to raise the picture-frame and suspend it from a nail or hook; and in the operation of raising or lowering a window the arm 9 is manipulated so as to engage with the lower or the upper part of the upper transverse portion of the frame of the window-sash, as will be readily understood.

Secured to the back of the arms 10 are cushions 22, one of which is shown in full lines in Fig. 2 and both of which are shown in dotted lines in Fig. 1; and the object of these cushions is to prevent scratching or otherwise injuring a wall in the operation of the device.

In suspending a picture-frame or other article from a nail or a stationary hook the cord or wire is first connected with the hanger by being passed through the space 17, and the device is raised and the nail or hook passed through the circular opening 11 beneath the cord or wire, and the device is then lowered, so that the nail or hook passes out through the passage or opening 12, the cord or wire being suspended therefrom or connected therewith, and it will be understood that the picture-frame or other article may be removed from the nail or stationary hook by inserting the arms 10 beneath and back of the wire, so that it enters between said arms 10 and the front plate 16, the nail or hook passing into the opening between the arms 10.

When a picture rail or molding is employed and a removable hook, in order to suspend the picture-frame or other article the hook is placed on top of the arms 10, across the openings 12, but not within the same, and the wire or cord is passed thereover, so that the hook rests and is held on the top of the device, and the device is then manipulated so as to suspend the hook from the hook-rail or molding, the wire or cord and picture thereto attached being left suspended therefrom, and when it is desired to remove the picture-frame or other article, together with the hook, the hanger is moved upwardly behind the hook until the latter rests upon and is supported by the top thereof, and then by moving the hanger upwardly the picture-frame or other article, together with the hook, will be detachable from the rail or molding, as will be readily understood.

It will also be seen that my improved picture-hanger is capable of being manipulated in various other ways, and the arm 19 is supplemental to my construction and may or may not be employed, but I prefer to employ the same for the purposes herein specified.

It will also be seen that the arms 10 are much broader than the opposite sides of the annular plate 15, the object of this construction being to enable said arms 10 to act as guides in the operation of passing the cord or wire between said arms and the upper ends of the opposite sides of the plate 15.

It will also be observed that the arm or extension 9, with which the arms 10 are connected, projects upwardly at one side of the sleeve or casing 5 and parallel therewith, and this arrangement of said arm or extension facilitates the operation of the device.

My improved picture-hanger may also be employed for manipulating the gas cocks or valves of chandeliers and other gas-fixtures, and in this operation the said device is raised until the head of the gas cock or valve passes between the beveled edges of the upper ends of the arms 10 and the opposite sides of the annular plate 15, and when the device has been thus connected with the gas cock or valve all that is necessary is to turn the handle in the desired direction and the gas cock or valve will be opened or closed.

My improved picture-hanger is simple in construction and operation and also comparatively inexpensive, while being well adapted to accomplish the result for which it is intended, and it will be apparent that changes in and modifications of the construction described may be made without departing from the spirit of my invention or sacrificing its advantages.

Having fully described my invention, I claim as new and desire to secure by Letters Patent—

1. A picture-hanger comprising a suitable arm which is provided with two upwardly-directed curved arms between which is a circular space which opens upwardly, a segmental plate secured to said arms below said circular space, a plate secured to said segmental plate, the upper portion of which is cut away and provided with an opening, substantially as described.

2. A picture-hanger comprising a sleeve or casing which is adapted to receive a handle, said sleeve or casing being also, provided at one side thereof with an extension which projects across the upper end thereof, and which is provided with an upwardly-directed arm, which is provided with two upwardly-directed curved arms between which is a circular space which opens upwardly, a segmental plate secured to said arms below said circular space, a plate secured to said segmental plate, and the upper portion of which is cut away and provided with an opening, substantially as shown and described.

3. A hanger for picture and other frames, consisting of a sleeve or casing which is adapted to receive a handle, said sleeve or casing being provided at its upper end with an arm which is offset therefrom, said arm being provided with two curved arms which are separated at their upper ends, and with a segmental plate, which is open at its upper side, and between the separate parts of which and the said arms, is a space or opening, substantially as shown and described.

4. A device for hanging pictures and other articles, and which is also adapted for use in operating gas cocks or valves, said device being provided with two upwardly-directed curved arms which are separated at their upper ends, and between which is an open space, the upper edges of said arms being beveled on their front sides, and a plate which is also open at the top and which is secured to said arms, and between the opposite sides of which and said arms is an open space or slot, and the upper portions of the opposite sides of which are beveled on their rear surfaces, substantially as shown and described.

5. A hanger for picture and other frames, consisting of a sleeve or casing which is open at both ends and provided at one side of one end with a strip which projects transversely of said end, an upwardly-directed arm integral with said strip, said arm being provided with two curved arms which are separated at their upper ends, and with a segmental plate which is open at its upper side, and between the separate parts of which and the said arms is a space or opening, substantially as described.

In testimony that I claim the foregoing as my invention I have signed my name, in presence of the subscribing witnesses, this 29th day of November, 1897.

ALFRED FOSGATE.

Witnesses:
L. E. CARPENTER,
E. A. ROSS.